United States Patent Office 3,161,588
Patented Dec. 15, 1964

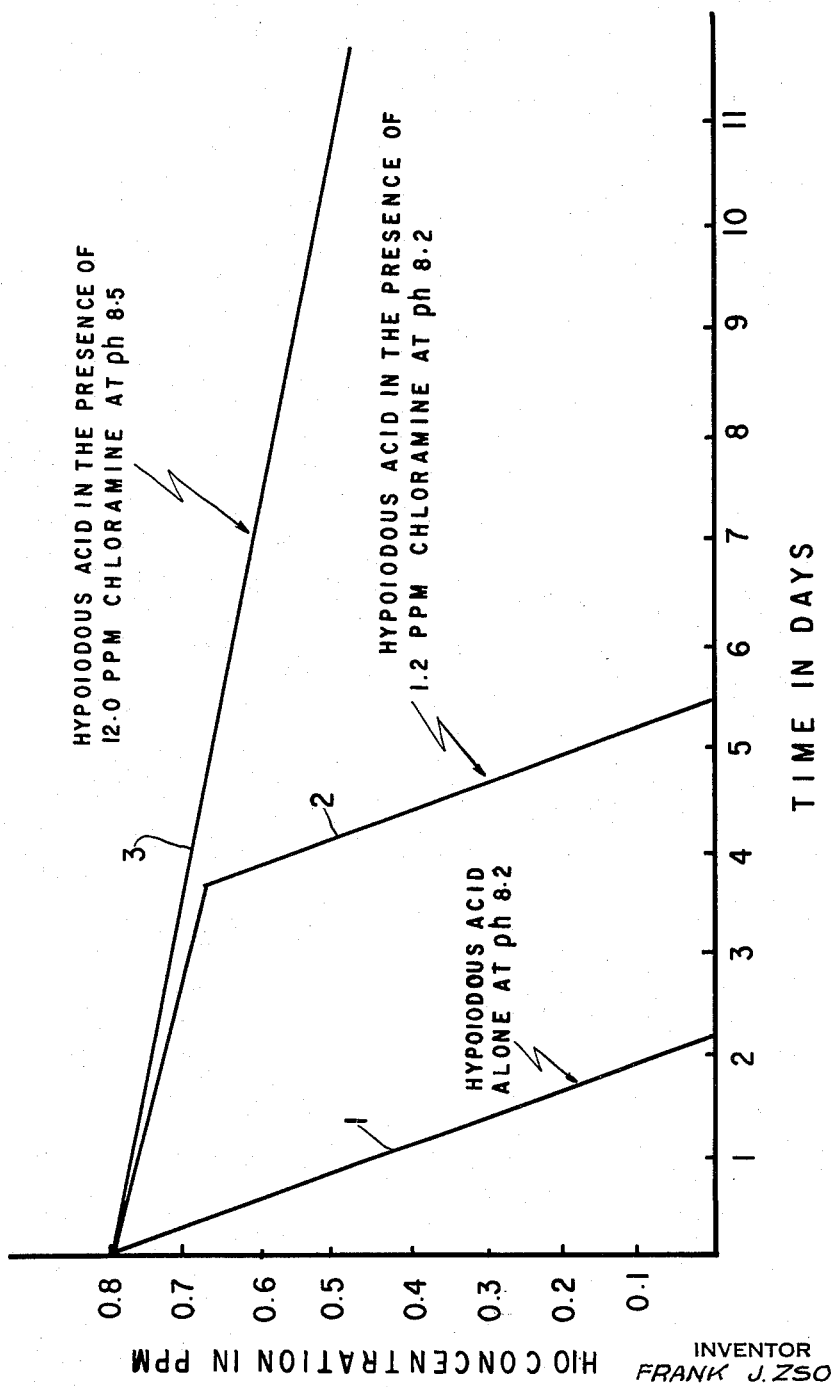

3,161,588
PROCEDURE FOR WATER TREATMENT
Frank J. Zsoldos, Jr., 25—63 33rd St., Astoria, N.Y.
Filed June 1, 1962, Ser. No. 199,483
7 Claims. (Cl. 210—64)

This invention relates to the treatment of bodies of water for the greatly prolonged control of oxidizable contamination and particularly for the control of contamination having germinal activity. This invention relates more particularly to procedure for the treatment of a body of water which constitutes a swimming pool and whereby said prolonged germicidal activity is provided by iodine and, according to this invention, improved procedure is provided whereby such germicidal activity is provided by hypoiodous acid in conjunction with a substantial chloramine bank.

The particular application of this invention being the most invaluable is the aforesaid treatment of water in swimming pools. According to present day methods of simple chlorination, there are difficulties due to odor and taste as well as coping with the very reactive action of chlorine and the difficulties encountered in keeping it in solution in the proper concentration for any practical length of time. Under conditions of actual use, free chlorine tends to combine too readily with harmless material dissolved in the water such as organic compounds, ammonium compounds and alkalies; and, under the influence of light, with the water itself. Because of its properties in this regard, proper sterilization using free chlorine is a matter of considerable difficulty as well as uncertainty. While attempts have been made to overcome the problems presented by the use of free chlorine by resort to more stable chlorine compounds such as chloramines, the effective chlorination thus accomplished is of reduced germicidal activity such that germicidal contact times increase about one hundredfold. It is because of these deficiencies as regards the germicidal activity of chlorine that attempts have been made to utilize chlorine for the purpose of producing iodine as the active germicidal agent, but such attempts have been accompanied by the further difficulties in other directions which this patent serves to solve. None of these prior attempts furthermore have been such as to result in a system wherein the effective germicidal and anti-contamination activity is provided by hypoiodous acid only, completely in the absence of diatomic iodine or iodides and continually maintained with a substantial chloramine bank.

The aforesaid difficulties alluded to as being common with previous attempts at swimming pool water iodination, culminate in the principal effect of off-color production and intensification. The problem of correct color control of swimming pool water is not as casual a one as it may seem to the uninitiated, for the factor of increasing intensity of color is directly associated with the percentage of light transmission through said water. It follows, therefore, that with any increase of color the water results in a corresponding decrease in underwater visability. Such loss of underwater visability obviously can only result in increasing the water hazards to which the swimmers are exposed, and it furthermore renders such water completely inadequate for use by competitive swimmers who must rely on underwater markings to establish their position relative to the pool; i.e., lane markers and warning lines.

Correct color control of swimming pool water under iodination is vital in still another direction. Through the years the preponderate majority of the lay public has been conditioned to believe that "sky blue water" is clean water and it thus has become, correctly or not, the badge of success in so far as superior swimming pool maintenance is concerned. This factor alone renders impossible the commercial success of any product that comprises the desired color of the water, regardless of other less noticeable or even important advantages of the product; and it has so greatly retarded the popular acceptance of swimming pool iodination that, notwithstanding the boom in swimming pool construction, the number of pools presently iodinated are very few indeed.

The aforesaid occurrence of color was encountered and reported by Black, Lackey and Lackey, "Effectiveness of Iodine for the Disinfection of Swimming Pool Water" (American Journal of Public Health, Vol. 49, No. 8, August 1959); by Marshall, McLaughlin and Carscallen, "Iodine Disinfection of a Cooperative Pool" (The Sanitarian, Journal of the National Association of Sanitarians, Vol. 22, No. 2, 1960); and most recently by E. V. Putnam, "Iodine vs. Chlorine—Treatment of Swimming Pools" (Parks and Recreation, April 1961 issue).

It is thus the purpose of this invention not merely to achieve superior water control as heretofore outlined, but to do so without impairing the optical quality of the water and it does so by rendering impossible the formation of those colored compounds of iodine primarily responsible, i.e., essentially diatomic iodine and the various polyiodides, while relying entirely on the colorless hypohalous form of iodine for germicidal activity.

It is of extremely great practical significance to be able to avoid the formation of diatomic iodine in swimming pools. For example, the presence of the commonly used quaternary ammonium algicides result in the formation of quaternary ammonium polyiodides that are highly stable as well as highly colored, thus rendering swimming pool water a very deep and uninviting green. In actual practice, the diatomic iodine itself possesses sufficient color to be severly objectionable.

It is thus an object of this invention to provide a procedure for treating a body of water subject to oxidizable contamination so as to provide a stabilized and continually regenerated source of germicidal concentration of colorless hypoiodous acid, the hypoiodous acid being provided without the concomitant occurrence of diatomic iodine and with the avoidance of any significant quantities of colored iodides and polyiodides.

It is a further object of this invention to provide a procedure whereby such a stabilized and continually regenerated source of germicidal concentration of hypoiodous acid may be maintained indefinitely in a body of water by addition of reactants at relatively infrequent intervals that may amount to several days.

According to this invention, a procedure is provided for generating within a body of water, that is subject to oxidizable contamination, a stabilized germicidal concentration of hypoiodous acid by the steps of adding to the body of water, which is at a pH between about 7.8 and about 8.4, a substantially stable oxidant such as a chloramine so as to maintain said oxidant in said solution for the desired period of time, and an iodine compound that has an oxidation potential lower than that of hypoiodous acid. This iodine compound is reactive with the oxidant at a pH within the aforesaid range to provide hypoiodous acid within the body of water at a concentration between 0.20 and 30 parts per million, the oxidant at a pH within the stated range being essentially non-reactive with hypoiodous acid and being essentially non-reactive with the non-iodine portion of the iodine compound. The molar ratio of the oxidant to monoatomic iodide of this procedure is between 6:1 and 120:1, with the oxidant being expressed on an available rather than an active basis.

A highly significant feature of this invention is that under absolutely no circumstances is the molar ratio of oxidant to monoatomic iodide ever to fall below the minimum 6:1 ratio specified above. This ratio is to be maintained regardless of the concentration of said hypoiodous acid in said solution.

The great practical advantage of the foregoing is that the accumulation of reaction products by the law of mass action has an adverse effect on the production of an effective amount of germicidally effective agent. Thus when chlorine is used in the form of a chloramine, the effectiveness of the chloramine results from the hydrolysis of the chloramine to form ammonia and hypochlorous acid. Ammonium compounds likewise are introduced into a swimming pool, for example, by swimmers and this likewise is a significant factor. Accordingly, the accumulation of the ammonium compounds tends to repress the hydrolysis whereby the hypochlorous acid is made available. When the hypochlorous acid further reacts with an iodide, the conversion of the iodide to hypoiodous acid likewise is repressed by the accumulation of reaction products. By the constant employment of a large molar excess of an oxidant such as a chloramine, the result is to greatly alleviate the repressive effects of a concentration of residual ammonium compounds and therefore greatly prolong the period during which treatment of the body of water may be continued before the build up of reaction products excessively reduces the amount of hypoiodous acid formed so as to no longer have adequate germicidal effectiveness.

Furthermore, the reaction of hypohalous iodine with organic matter yields many organic iodides that are highly colored and react very slowly with chloramine or even not at all unless the oxidant is constantly maintained at or above the aforesaid minimum ratios, and thus the only way in which such objectionable formations are to be avoided is through constant reaction with said excesses of chloramine.

The conversion of iodine to colorless hypohalous iodine in swimming pool waters necessarily must occur at great dilution, namely, only a few parts per million. At these dilutions the chemical reaction is so impaired that only by resorting to the continuous said excess of chloramine can the quantitative conversion to hypoiodous acid occur.

If at any time the lower limit of said ratio is violated, progressively greater concentrations of the lesser forms of iodine will be formed; diatomic iodine and iodides. It is to be noted again that diatomic iodine and iodides will combine with macrocations such as the alkaloids and the previously mentioned quaternary ammonium compounds to form colored substances that are essentially non-reactive with chloramine and will thus permanently affect the optical quality of said pool water.

Likewise, the presence of colloidal particles such as fats, oils and detergents will react with and absorb large quantities of diatomic iodine, resulting in colored products that can no longer effectively be oxidized by the oxidant available, thus rendering said water unfit for said pool use.

Therefore, it can be seen that only through continuous and complete conversion of iodine to the colorless hypohalous form with the thorough elimination of the lesser diatomic iodine and iodides, can swimming pool water be successively iodinated without impairment of its optical quality; and this state, furthermore, can only be achieved by never violating the said minimum of oxidant to iodide ratios.

A proposal for the continuous production of what is alluded to as available iodine solutions in swimming pools through reaction with powerful oxidizing agents is contained in Patent No. 2,443,429. Gaseous chlorine or the hypochlorites are described as being metered continuously or periodically into a solution to which ammonia and iodide have been added. The free chlorine is said to combine with the ammonia in the solution with the formation of an expendable chloramine oxidizer for reaction with iodide and thereby produce germicidal iodine within the pH ranges defined for swimming pool operation. This proposal, however, possesses great practical weakness in that it does not take into account not only pH control, but also the matter of control in relation to such other of the three substances, i.e., inorganic chlorine, ammonia and iodide. Moreover, while reference is made to a stoichiometric excess of chlorine to iodide, an iodide can be oxidized stoichiometrically by chlorine to any of three successive states, i.e., diatomic iodine, hypoiodous acid and iodate; and since available iodine may be in the form of either diatomic iodine or hypoiodous acid, the presence of diatomic iodine is not excluded, which is detrimental to continued maintenance of desired hypoiodous acid concentrations.

It is absolutely essential that inorganic chlorine never occur in the solution in stoichiometric excess over that necessary to react with ammonia to form chloramine and with iodine to form hypoiodous acid, for a continued feeding of an excess of free chlorine beyond such a point would render all three ineffective by conversion to non-germicidal chlorides, iodates and nitrogen. If, furthermore, the pH of said solution is not adequately maintained, the said nitrogen would occur as extremely irritating and odorous nitrogen trichloride. On the other hand, an insufficient supply of ammonia to said solution would accomplish much the same thing, while an excess of iodide would cause the degeneration of the hypoiodous acid in a manner which shall be subsequently discussed. When it is considered that in a preponderate proportion of institutions, both public and private, the problem of swimming pool operation is placed in the charge of untrained grounds-keepers or janitors, the matter of lack of control in the directions above indicated becomes a matter of utmost seriousness.

A further proposal is contained in Patent 2,817,621, according to which acid conditions are called for which are intended to minimize the carrying over of the iodine to the inert iodate form, but the conditions are designed to avoid the production of hypoiodous acid by reason of its assumed instability.

In connection with the investigation of possible utility of hypoiodous acid, there are other instances of its production in limited quantities, but such quantities have been deliberately in conjunction with diatomic iodine and the useful life of the hypoiodous acid has necessarily been limited to a period of from five minutes to one hour.

In Patent 2,904,470 a process is disclosed whereby considerably less than molar equivalents of chlorine and iodide for the stoichiometric oxidation of iodide to hypoiodous acid are combined to generate diatomic iodine and hypoiodous acid. Moreover, according to the disclosure, a primary function of the hypoiodous acid content, aside from temporary germinal activity, is to achieve the reoxidation of the iodide reformed by reaction of iodine with organic matter, in order that optimum quantities of diatomic iodine may be maintained at the expense, of course, of the hypoiodous acid content.

It is thus a further purpose of this invention not merely to achieve superior water control as heretofore outlined, but also to establish a new method which is the essence of simplicity for the benefit of a lay public and with the further elimination of the hazards associated with inorganic chlorine operation. Thus chlorine gas is dangerous to handle, while caustic liquid hypochlorite and solid hypochlorite assume explosive characteristics when accidentally contaminated by oxidizable material. A still further disadvantage of said materials which have heretofore been proposed as aforesaid resides in the inferior stability under usual conditions of storage and the consequent inadvisability of keeping them from one season to the next.

As previously stated, the presence of diatomic iodine places limits on the stability of the preferred hypoiodous acid. Hypoiodous acid at a pH between 6 and 8 decomposes slowly to yield diatomic iodine and iodate, as may be illustrated by reaction 1 below. However, the diatomic iodine that is formed or may be initially present undergoes hydrolysis to produce iodides and additional hypoiodous acid by reaction 2. The iodide thereupon, by reaction 3, reacts with the hypoiodous acid yielding additional diatomic iodine. With the increasing concentrations of the diatomic iodine produced by reactions 1, 2 and 3, the rate of reaction 2 is gradually slowed and eventually replaced by the fourth reaction, which reaction, as it can be seen, precludes the hydrolytic regeneration of hypoiodous acid. On the contrary, it contributes to the ever greater formation of iodide, with the consequent complete elimination of all hypoiodous acid concentrations. The aforesaid reactions may be indicated as follows:

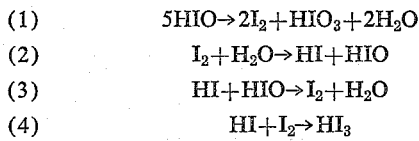

(1) $\quad 5HIO \rightarrow 2I_2 + HIO_3 + 2H_2O$ (2) $\quad I_2 + H_2O \rightarrow HI + HIO$ (3) $\quad HI + HIO \rightarrow I_2 + H_2O$ (4) $\quad HI + I_2 \rightarrow HI_3$ As between reactions 1 through 4 above, reaction 1 is slower than reactions 2, 3 and 4 and it follows that in any system at pH levels substantially over 6 at which water appreciably effects the hydrolysis of the diatomic iodine the system is inherently unstable. Lowering the pH to levels below 5 to prevent such hydrolysis is of no avail, for it merely accelerates the rate of reaction 1 and renders the solution corrosive. Moreover, such lower pH levels preclude the use of many oxidizers that normally may be employed at a higher pH, for the oxidation potential of hypoiodous acid increases markedly from 0.49E° volts in alkali to 1.45E° volts in acid medium and consequently renders the initial generation of hypoiodous acid that much more difficult to accomplish.

In accordance with this invention, the dynamics are controlled so as to accomplish a slowing down of reaction 1 by maintaining the pH through the addition of sodium bicarbonate buffers so as to be at least 7.8, but not over 8.4, and the dynamics are further controlled by the aforesaid elimination of the diatomic iodine which is produced according to reaction 1 so that the iodine occurs again as hypoiodous acid, without, however, employing an oxidant which substantially oxidizes and therefore destroys the hypoiodous acid that is produced in the body of water. Preferably, an oxidant is used whose oxidation potential couple is greater than that of the iodide-diatomic iodine couple, but which has less than the oxidation potential of hypoiodous acid. Under such conditions the dynamics are such that iodide or other iodine compound which is added or formed within the body of water is acted upon by the oxidant with the aid of hydrolysis to produce hypoiodous acid, but the oxidant does not decompose the hypoiodous acid to form inert iodates. Moreover, by providing a suitable excess of the oxidant so that the molar ratio of the oxidant on an available basis to monoatomic iodide is never less than between 6:1 and 120:1; then, to the extent that reaction 1 above tends to occur, the diatomic iodine that is formed becomes restored again to hypoiodous acid and reactions 2, 3 and 4 are prevented from occurring. In this way an effective concentration of hypoiodous acid can be provided for a very substantial period of time and the hypoiodous acid is maintained in the body of water in the absence of diatomic iodine with the resultant advantages hereinabove mentioned.

While the foregoing constitutes the preferred practice of this invention, it also is possible to employ an oxidant couple whose potential is the same as or only slightly greater than that of hypoiodous acid. In such case the formation of diatomic iodine is prevented and, while under such conditions there may be some iodate formation, such formation is so slight as not to result in an excessive loss of iodine.

By resorting to pH's between 7.8 to 8.4, not only may milder oxidizing agents be used, for in such case the hydroxyl ions that are present aid as previously described in effecting oxidation, but also the higher pH reduces the oxidation potential of the hypoiodous acid and in such case it does not react as readily with inconsequential organic contamination and a more prolonged solution life of the hypoiodous acid may be attained.

By maintaining the pH within the limits aforesaid and by establishing a constant molar excess of oxidant whose oxidation potential is in the limits aforesaid, various concentrations of hypoiodous acid have been maintained for substantial periods of time. Thus a concentration of 65 parts per million of hypoiodous acid was prepared and maintained for many hours. A solution of 10 parts per million having effective germicidal activity has been maintained for two weeks, while a germicidally effective solution containing 2 parts per million of hypoiodous acid remained active for twenty-seven days. In one such experiment, which is shown diagrammatically in FIG. 1 of the accompanying drawing, there was added to 20 liters of water 0.20 grams of potassium iodide and 0.35 grams of sodium p-toluene sulfonchloramide, the pH of the water being maintained with sodium bicarbonate buffers at 8.2. The relatively rapid reduction in hypoiodous acid concentration under these conditions is indicated by line 1. The experiment was repeated with the same amount of potassium iodide and water except that the quantity of added sodium p-toluene sulfonchloramide was increased to 1.25 grams so as to provide 1.2 parts per million excess available chloramide. In such case, the concentration of the hypoiodous acid was prolonged and then fell off rapidly, as indicated by line 2. When the reserve of added available chloramine was increased by increasing the addition of sodium p-toluene sulfonchloramide to 10 grams so as to provide a chloramine residual of approximately 12 parts per million, then the concentration of the hypoiodous acid remained at an effective level for twenty-one days, as indicated by line 3.

The factor of continuous contamination of the treated bodies of water serves to minimize the decomposition of hypoiodous acid into iodates rather than otherwise due to the fact that such contamination when it is present is more readily reactive with the hypoiodous acid to produce iodides and such iodides as are thus produced are immediately reconverted to hypoiodous acid by virtue of the constant large molar excess of the oxidant that is present. The present invention, therefore, provides a significant improvement in the art in that the hypoiodous acid is effectively maintained, but also is maintained in the absence of diatomic iodine and without any substantial loss of iodine due to iodate formation.

The permissible large excess of oxidant over iodide established by this new method is such that in actual practice but one concentration need be accurately controlled, namely, the iodide. The liberal range of oxidant concentration calls only for a mere confirmation of a minimum concentration. By choosing specific easy-to-handle non-hazardous oxidants capable of reacting with iodide as defined, the new method reduces the number of reactants to two, iodide and oxidizer. It is furthermore preferred practice to units and employ them as a single additive, thus reducing the procedure to the utmost in simplicity. The combination may be attained, for example, by resorting to the new sandwiched tablet technique for the incorporation of incompatible substances or by utilizing drying techniques with subsequent moisture-proof packaging.

From the point of view of germicidal activity, any iodide may be used. However, for bodies of water such as a swimming pool or drinking water, the iodide should be a non-toxic iodide as, for example, those of the alkali metals as well as those of calcium or ammonium.

As to the oxidant, while a chloramine is normally used in the practice of this invention, bromine also may be used. In other words, what is required in the case of a halogen is that the halogen be one which is lighter than iodine and which in the nitrogen compound is covalently bonded to the nitrogen so as to avoid an excessive oxidation potential while at the same time providing a halogen oxidant residual effective for converting iodine or an iodide to hypoiodous acid.

While the oxidant preferably is in the form of a nonhazardous chloramine, as compared to the inorganic chlorines, other oxidants may be used in the practice of this invention provided the oxidation potential thereof is such as to convert iodine or an iodide to hypoiodous acid but is not such as to cause excessive conversion of hypoiodous acid to negative iodate. In other words, the oxidation potential should be between 0.20 and 0.55E° volts in alkaline systems. Examples of such alternative oxidants are metallic persulfates and ceric salts such as potassium, sodium or ammonium persulfate and ceric sulfate or ceric ammonium sulfate. These salts are normally overly powerful oxidizing agents in acid media, and only because their activity recedes markedly in alkaline media can their energies be utilized for purposes of this invention. In fact, their activity is so greatly reduced by increasing alkalinity that it is necessary to resort to silver or copper ions in order to initiate their reaction. These oxidants, however, possess unusal solution stability and preparations made from them have a greatly prolonged useful life, and are thus applicable to many purposes other than swimming pool sanitation. Consequently, they would be the oxidants of choice in the compounding of sanitizers for the disinfection of fruits and vegetables and for maintaining decorative fountains free from unwanted growth. Their oxidation of iodide to iodine within the prescribed pH limits occurs as follows:

$$S_2O_8^= + 2I^- \rightarrow 2SO_4^= + I_2$$
$$Ce^{++++} + 2I^- \rightarrow Ce^{+++} + I_2$$

The diatomic iodine formed is converted to hypoiodous acid through subsequent hydrolysis with water, the reaction being as follows:

$$I_2 + H_2O \rightarrow HIO + HI$$

The foregoing reactions are fairly slow and therefore limit the solutions to those applications where the introduction of contamination into the solution likewise is slow but greatly prolonged.

As an example for illustrative purposes only, a 20 liter germicidal solution can be prepared by dissolving in water 0.200 gram potassium iodide to develop 8 p.p.m. hypoiodous acid after reaction with 2.40 grams of added potassium persulfate, which establishes the effective oxidizer bank at a 10:1 molar ratio.

Another class of oxidants useful for purposes of this invention other than swimming pool disinfection are those iodine atoms of an electro-positive nature that are capable of reacting with iodide to form iodine, with the hydrolyzing effect of water aiding in the further conversion to hypoiodous acid as with persulfates and ceric salts. Iodo-pyridine-nitrate is such a compound possessing a uni-positive iodine which will react with iodide in the following manner:

$$I + I^- \rightarrow I_2 + HOH \rightarrow HIO + HI$$

The other related compounds iodo-B-picoline and iodo-2,6-lutidine will function in a similar manner. These compounds, though usable, are however not the agents of choice as they do not provide long lasting oxidant residuals. Ozone likewise, though capable of performing as an oxidant at pH values of 7.8 to 8.4, does not provide sufficient solution stability as to make it the preferred material.

A great practical further advantage of the present invention when applied to its preferred use of swimming pool sanitation is evident when it is considered that a germicidal concentration of hypoiodous acid may be maintained for a sufficiently long period of time so that it is only necessary to replenish the oxidant at periods which may be of the order of once or twice a week. The iodide replenishment may be accomplished at intervals but desirably may be added in a small but continuously metered amount so that an almost constant level of hypoiodous acid may be maintained. It has been shown that a steadily maintained hypoiodous acid concentration of about 0.4 part per million will result in superior bacteriology as compared with a system which allows the hypoiodous acid concentration to rise to about one part per million and then fall down to nearly zero before being regenerated. Such continuous addition of iodide may be easily resorted to in the practice of this invention in view of the large constant minimum molar excess of oxidant which is maintained. Without this constant large molar excess of oxidant there is danger of added iodide becoming converted to highly colored polyiodides. According to this invention as previously indicated, the formation of such colored compounds, which give their first warning by their occurrence, can be avoided and proper conditions can be maintained simply by periodic tests for determining the concentration of the oxidant and the concentration of the hypoiodous acid.

The oxidant which is preferably used in the practice of this invention is a chloramine as previously described whose oxidation potential is effective to accomplish the conversion of an iodide or elemental iodine to hypoiodous acid while at the same time being sufficiently stable when in the molar excess hereinabove mentioned throughout the time that it is desired to maintain the active hypoiodous acid solution and to avoid any substantial further oxidation of a hypoiodous acid so as to form an iodate. Normally, sufficient of the chloramine compound is added to the body of water so as to provide from 3 to 10 parts per million available chloramine, which concentration is maintained by supplemental feedings as required. This quantity of the chloramine provides the reserve bank of oxidant and enough iodide or other source of iodine is added so as to provide, in the case of a swimming pool for example, about 0.6 parts per million of hypoiodous acid.

By way of more specifically illustrating the practice of this invention, in the case of a swimming pool it is desirable to maintain a molar ratio of available chlorine to monoatomic iodide averages of about 16:1 and which is maintained so as not to be less than 8:1 and preferably not less than 10:1; and to maintain a bank of the chloramine oxidant of the order of 4.0 parts per million. For providing the bank of chloramine, one may add, for example, to a 200,000 gal. pool on the first day enough of the chloramine oxidant to bring the amount of chlorine available by hydrolysis of the chloramine to 3.0 parts per million. Examples of suitable chloramine additives to provide the aforesaid concentration are as follows:

| Compound | Available Chlorine, percent | Weight, grams |
|---|---|---|
| Chloroazodin | 75 | 3,168 |
| Sodium p-toluene-sulfon-chloroamide | 25 | 9,388 |
| P-toluene-sulfondichloroamide | 60 | 3,960 |
| Sodium benzene-sulfon-chloroamide | 28 | 8,329 |
| P-sulfondichloroamido benzoic acid | 52 | 4,570 |
| Trichloromelamine | 92 | 2,583 |
| Sodium dichloroisocyanurate | 64 | 3,672 |
| Dichloroisocyanurate | 72 | 3,307 |
| Trichloroisocyanurate | 92 | 2,583 |
| Succinchlorimide | 53 | 4,420 |
| Dichlorodimethylhydantoin | 66 | 3,600 |

On the day immediately following the day of initial addition of the chloramine compound approximately half of the chloramine additive used on the first day is added to the pool so as to bring the chloramine content up to approximately 4 parts per million of available chlorine residual. Also, on the second day enough metallic iodide or iodine is added to result in the production of 0.6 part per million of hypoiodous acid. Examples of suitable iodine sources are as follows in the case of the 200,000- gal. pool, which has been mentioned for illustrative purposes:

| Compound | Iodine, percent | Added, grams |
|---|---|---|
| Potassium iodide | 76.45 | 595 |
| Sodium iodide | 84.66 | 536 |
| Lithium iodide | 94.81 | 479 |
| Crystalline iodine | 100.00 | 454 |
| Solution of Elemental iodine in any one of above iodides | (1) | X |

[1] Variable as desired.

Following the second day, the contents of the pool may be tested from time to time in order to determine the content of hypoiodous acid, and enough iodine compound is added either continuously or from time to time so as preferably to maintain the hypoiodous acid content between about .2 and about .8. It is only necessary to check the content of the chloramine compound every two or three days in order to determine whether or not a supplemental charge may be necessary. Of course, the greater the initial molar excess of chloramine in relation to monoatomic iodide, the necessity for a supplemental charge of chloramine becomes less frequent. The chloramine content of the water can be readily checked by known procedures such as by the use of a color comparator using the classic starch-iodide reaction, which will yield an intense blue in the presence of 5 parts per million chloramine. The content of hypoiodous acid residual in the water can be tested by any suitable known method as by the use of any one of the aromatic amines such as ortho-tolidine, dimethyl-p-phenylenediamine or benzidine that yield an intense color with iodine. In order to block out the chloramine from this test, a separate buffer must be used consisting of a combination of alkalies and ammonium compounds such as ammonium carbonate or triethylene-tetramine, or both.

It may at times be preferable to bring up the content of the chloramine residual gradually over a matter of two days or more in order to minimize the initial occurrence of chlorine in an amount such as to attack the iodine and convert it to iodate rather than hypoiodous acid. By adding the chloramine gradually, a residual amine reaction product is built up which retards the rate of hydrolysis of the chloramine compound and thereby minimizes initial excessive conversion of iodine to inert iodate rather than hypoiodous acid.

The foregoing compounds are merely illustrative and others may be used for providing the proper relationship of oxidation potential as between iodide, on the one hand, and hypoiodous acid.

As mentioned above, in the practice of the invention the body of swimming pool water should be at a pH between 7.8 and 8.4. Since most such bodies of water tend to drop to a pH of approximately 7.6 due to the dissolution of the carbon dioxide therein as well as the accumulation of body acids, it is recommended that a pH determination be made from time to time and that a suitable non-toxic alkaline material be added, such as sodium bicarbonate or sodium carbonate. Such materials may be added either with the chloramine or with the metallic iodide.

The following examples illustrate the effectiveness in maintaining a substantially uniform amount of hypoiodous acid residual from day to day and during different parts of the day, with a chloramine bank of from 3 to 4 p.p.m. and a chloramine to iodine ratio of approximately 10:1.

EXAMPLE I

*Treatment of 24,000-Gallon Indoor Pool*

| Days | Chemicals Added, grams | | pH | Temp., Water, °F. | Daily Bathers | HIO Residual | | | Bacteriology [1] | |
|---|---|---|---|---|---|---|---|---|---|---|
| | DDMH [2] | KI | | | | AM | M | PM | E. Coli | STPC |
| 1 | 300 | 112 | | | | | | | | |
| 2 | 300 | 50 | | | | | | | | |
| 3 | 300 | 50 | 8.5 | 82 | 25–50 | 0.6 | 0.6 | 0.6 | <2.2 | 0 |
| 4 | None | | 8.5 | 82 | 25–50 | 0.6 | 0.6 | 0.6 | <2.2 | 0 |
| 5 | None | | 8.5 | 82 | 25–50 | 0.6 | 0.6 | 0.6 | <2.2 | 2 |

[1] Minimum swimming pool standards specify E. Coli at <2.2 and standard total plate count at <200
[2] DDMH is dichlorodimethyl hydantoin.

EXAMPLE II

*Treatment of 75,000-Gallon Outdoor Pool*

| Days | Chemicals Added, grams | | pH | Temp., Water, °F. | Daily Bathers | HIO Residual | | | Bacteriology | |
|---|---|---|---|---|---|---|---|---|---|---|
| | DDMH | KI | | | | AM | M | PM | E. Coli | STPC |
| 1 | 900 | 338 | 8.2 | 74 | 50–75 | 1.0 | 1.0 | 0.8 | <2.2 | 0 |
| 2 | 900 | 150 | 8.0 | 74 | 50–75 | 0.7 | 0.7 | 0.7 | <2.2 | 1 |
| 3 | 900 | 105 | 8.0 | 74 | 50–75 | 0.8 | 0.8 | 0.8 | <2.2 | 2 |
| 4 | 675 | 50 | 8.0 | 74 | 50–75 | 0.7 | 0.7 | 0.7 | <2.2 | 0 |

In selecting the chloramine compound that is used in the practice of this invention, that compound should be selected which has the required stability under the prevailing conditions of use. For example, chloramine-T, which is sodium para-toluene sulfonchloramide, under conditions of exposure to sunlight is acted upon by the hypoiodous acid that is produced reacting with the toluene radical thereof with the resultant loss of hypoiodous acid. Accordingly, chloramine-T preferably is not used outdoors but may be successfully used indoors. Moreover, the choice of chloramine for the system relates directly to the nature of the water being purified. If public drinking supplies are to be treated, then the completely non-toxic materials are to be preferred. If, however, a heavily used indoor swimming pool is to be treated and the maintenance of an extra large chloramine bank is desired, then one of the extra stable and odorless chloramines such as chloramine-T or halazone are to be used. Contaminated lakes, on the other hand, would of course consume extra large quantities of chloramine, and local economics would in this case dictate the use of the cheapest chloramine available.

It is also of particular advantage when dealing with swimming pool chemicals to incorporate with either the chloramine or iodide one of the relatively insoluble compounds of copper such as the hydroxide, carbonate or iodide at the rate of less than 1% (the use of more soluble copper compounds would compromise the stability of the resulting mix). The purpose of this addition would be to maintain minimal concentrations of copper (less than 1.5 p.p.m.) in the water as an aid to algae control. The upper limits of copper content in the water would be controlled to some extent by the very small iodate formation that occurs. Iodates form insoluble basic salts with the heavy metals and they would, therefore, in this case lead to precipitation of excess quantities (over 1.5 p.p.m.) of both copper and iodate. The reaction is as follows:

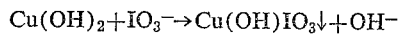

I claim:

1. The procedure for generating within a body of water, subject to oxidizable contamination, a stabilized and continually regenerated source of germicidal concentration of hypoiodous acid, whereby the accumulation of objectionable iodination products are largely eliminated by constant reconversion to said hypoiodous acid, said procedure comprising the inclusion in said body of water of an alkaline material sufficient to impart a pH between about 7.8 and about 8.4, a substantially stable oxidant and an iodine compound that has an oxidation potential lower than that of hypoiodous acid and that is reactive with said oxidant at a pH within said range to provide hypoiodous acid within said body of water at a concentration between 0.20 and 30 parts per million, said oxidant at a pH within said range being essentially non-reactive with hypoiodous acid and being essentially non-reactive with the non-iodine portion of said iodine compound, and maintaining a quantity of said oxidant in said body of water such that the molar ratio of said oxidant to monoatomic iodide is essentially between 6:1 and 120:1, said ratio being expressed on an available basis.

2. The procedure of claim 1 wherein the oxidation potential of said oxidant is lower than that of hypoiodous acid, but is reactive with metallic iodide.

3. The method of claim 1 wherein said oxidant is a compound comprising nitrogen covalently bonded with a halogen lighter than iodine.

4. The method of claim 3 wherein said compound is a chloramine.

5. The method of claim 1 wherein said oxidant is an oxidant which is selected from the group consisting of chloramines, persulfates, ceric salts, electro-positive iodine compounds and ozone and which has an oxidation potential of substantially between 0.20 and 0.55 volt.

6. A method according to claim 1 wherein said oxidant and said iodide are added simultaneously in predetermined relative amounts disposed in a physically integral unit.

7. A method according to claim 1 wherein there is included in said body of water a soluble copper compound which provides an appreciable concentration of copper less than about 1.5 parts per million to react with any iodate accumulations.

References Cited in the file of this patent
UNITED STATES PATENTS

| | | |
|---|---|---|
| 2,817,621 | Marks et al. | Dec. 24, 1957 |
| 2,902,405 | Carroll et al. | Sept. 1, 1959 |
| 2,904,470 | Berliner et al. | Sept. 15, 1959 |

UNITED STATES PATENT OFFICE
CERTIFICATE OF CORRECTION

December 15, 1964

Patent No. 3,161,588

Frank J. Zsoldos, Jr.

It is hereby certified that error appears in the above numbered patent requiring correction and that the said Letters Patent should read as corrected below.

Column 1, line 72, for "comprises" read -- compromises --; column 6, line 59, for "units" read -- unite --.

Signed and sealed this 19th day of October 1965.

(SEAL)
Attest:

ERNEST W. SWIDER
Attesting Officer

EDWARD J. BRENNER
Commissioner of Patents